United States Patent
Na (10) Patent No.: US 9,591,694 B2
(45) Date of Patent: Mar. 7, 2017

(54) ACCESS POINT AND METHOD OF CONTROLLING CHANNEL CHANGE IN THE SAME

(75) Inventor: Hyun-Jung Na, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 2623 days.

(21) Appl. No.: 12/010,324

(22) Filed: Jan. 23, 2008

(65) Prior Publication Data

US 2008/0186914 A1  Aug. 7, 2008

(30) Foreign Application Priority Data

Feb. 5, 2007 (KR) .................. 10-2007-0011595

(51) Int. Cl.
*H04W 4/00* (2009.01)
*H04W 92/20* (2009.01)
*H04W 84/12* (2009.01)

(52) U.S. Cl.
CPC ............ *H04W 92/20* (2013.01); *H04W 84/12* (2013.01)

(58) Field of Classification Search
CPC .................................................... H04W 92/20
See application file for complete search history.

(56) References Cited

U.S. PATENT DOCUMENTS

| | | | | |
|---|---|---|---|---|
| 5,426,637 | A * | 6/1995 | Derby et al. ............. | 370/401 |
| 6,240,077 | B1 * | 5/2001 | Vuong .................. | H04J 3/1682 370/319 |
| 2005/0090250 | A1 * | 4/2005 | Backes ................. | H04L 47/125 455/434 |
| 2006/0098592 | A1 | 5/2006 | Proctor Jr. et al. | |
| 2006/0262733 | A1 * | 11/2006 | Guo et al. ..................... | 370/254 |
| 2007/0030823 | A1 | 2/2007 | Guo et al. | |
| 2007/0076642 | A1 | 4/2007 | Chien et al. | |
| 2007/0104139 | A1 * | 5/2007 | Marinier et al. ............. | 370/329 |
| 2007/0105552 | A1 * | 5/2007 | Hun et al. ..................... | 455/434 |
| 2007/0115901 | A1 | 5/2007 | Lin | |

(Continued)

FOREIGN PATENT DOCUMENTS

| | | |
|---|---|---|
| KR | 10-2006-0107415 | 10/2006 |
| KR | 10-2007-0007668 | 1/2007 |

OTHER PUBLICATIONS

A Decision of Grant from the Korean Intellectual Property Office issued in Applicant's corresponding Korean Patent Application No. 119981042713 dated Oct. 29, 2008.

(Continued)

*Primary Examiner* — John Blanton
(74) *Attorney, Agent, or Firm* — H.C. Park & Associates, PLC (57) ABSTRACT

An access point and a method of controlling channel change in the access point. The access point includes: a channel change event detector for checking whether an event of requesting to change a channel used for transmitting and receiving a packet between the access point and a counterpart access point occurs; and a channel change control unit for performing channel change while maintaining channel-synchronization with the counterpart access point constituting a Wireless Distribution System (WDS) link when the channel change event occurs. According to the access point and method, a WDS link is normally maintained even when the channel of an access point is changed.

5 Claims, 4 Drawing Sheets

(56) References Cited

U.S. PATENT DOCUMENTS

2008/0146230 A1\* 6/2008 Pandian et al. ............... 455/436

OTHER PUBLICATIONS

Office Action from the Korean Patent Office issued in Applicant's corresponding Korean Patent Application No. 2007-0011595 dated Apr. 24, 2008.
IEEE Computer Society, "IEEE Standard for Information Technology—Telecommunications and information exchange between systems—Local and metropolitan area networks—Specific requirements—Part 11: Wireless LAN Medium Access Control (MAC) and Physical Layer (PHY) Specifications", Jun. 2007, IEEE, New York, NY, USA, Std 802.11-2007, pp. 1-724.
Krishna N. Ramachandran, et al., "Interference-Aware Channel Assignment in Multi-Radio Wireless Mesh Networks," Infocom 2006, 25th IEEE International Conference on Computer Communications, Apr. 1, 2006, pp. 1-12.
European Search Report dated Nov. 25, 2011 issued for related European Application No. 08001658.7.

\* cited by examiner

ACCESS POINT AND METHOD OF CONTROLLING CHANNEL CHANGE IN THE SAME

CLAIM OF PRIORITY

This application claims the benefit under 35 U.S.C. §119(a) from an application for ACCESS POINT AND METHOD OF CONTROLLING CHANNEL CHANGE IN THE SAME, early filed in the Korean Intellectual Property Office on 5 Feb. 2007 and there duly assigned Serial No. 2007-0011595.

BACKGROUND OF THE INVENTION

Field of the Invention

The present invention relates to a Wireless Distribution System, more specifically, to an improved access point and an improved method of controlling channel change in the access point for the Wireless Distribution System.

Description of the Related Art

A Wireless Distribution System (WDS) is a system enabling wireless connection either between access points or between an access point and a repeater on the basis of technology that expands a wireless service area which is hardly covered by using one access point without adding an extra wired line. A wireless data transmission method in a WDS section is defined in the Institute of Electrical and Electronics Engineers (IEEE) 802.11 standard.

In order to establish a WDS link, two (2) access points in a WDS must have a counterpart's Media Access Control (MAC) address information and must wirelessly transmit and receive data in a same channel. When these two (2) access points have a counterpart's MAC address, they operate as if a new bridge port was created.

Data in a WDS section is defined in the IEEE 802.11 standard to be distinguished from general data transmitted between an access point and a terminal. The WDS section data uses all of four (4) addresses in an IEEE 802.11 MAC header, and uses 2 bits of ToDS and FromDS among control fields of the MAC header bits and ToDS and FromDS are both set to "1". The four (4) addresses refer to RA (Receiver Address), TA (Transmitter Address), SA (source address), DA (destination address). Data between an access point and a terminal, however, uses a maximum of three (3) addresses according to frame types and uses the bits of ToDS and FromDS set to (1, 0), (0, 1) or (0, 0). Three (3) addresses refer to DA, SA, BSSID (Basic Service Set Identifier). Clearly, data in a DWS section and data transmitted between an access point and a terminal are different from each other.

To normally transmit and receive data in a WDS section, a counterpart access point's MAC address, a security mode in the WDS section, and a channel must be properly set in two (2) access points. The counterpart access point's MAC address and the security mode are hardly changed once they are set. Moreover, since a user manually changes them, they cannot be changed without the user's knowledge. The channel, however, may be changed without a user's knowledge when the user uses an automatic channel other than a fixed channel, and thus a WDS link may be disconnected.

Particularly in an 11a (5 GHz) band, many countries indispensably require supporting of a Dynamic Frequency Selection (DFS) function. When the DFS function is supported, the channel of an access point may be changed to avoid the surrounding radar signal interference. When a WDS is used in the 11a band under this situation, channels of two (2) access points may be set differently, and it may be impossible to normally support the WDS.

SUMMARY OF THE INVENTION

It is therefore an object of the present invention to provide an improved wireless distribution system.

It is another object to provide a wireless distribution system that has an access point that, when a channel change event occurs, checks the state of a counterpart access point, either performs channel change alone or changes a channel while maintaining synchronization with the counterpart access point according to the check result, and thereby maintains a Wireless Distribution System (WDS) link, and a method of controlling channel change in the access point.

A first aspect of the present invention provides an access point, including: a channel change event detector checking whether an event of requesting to change a channel used for transmitting and receiving a packet between the access point and a counterpart access point occurs; and a channel change control unit performing channel change while maintaining a channel-synchronization with the counterpart access point constituting a WDS link when the channel change event occurs.

The access point may further include: a Media Access Control (MAC) address table storing a MAC address of the counterpart access point; and a sync flag register for storing a sync flag indicating whether or not a channel of the access point is synchronized with a channel of the counterpart access point. The channel change control unit may include: a channel sync request determination module checking the MAC address table and the sync flag register and thus determining whether or not a channel sync request to the counterpart access point is required.

The channel sync request determination module may control the access point to transmit a channel change request message to the counterpart access point when the MAC address of the counterpart access point exists in the MAC address table, the sync flag register checks that the channel of the access point is synchronized with that of the counterpart access point. The channel sync request determination module may search the MAC address table and, when the MAC address of the counterpart access point does not exist in the MAC address table, select a channel according to a channel selection policy and perform channel change alone. The channel sync request determination module may control the access point to perform channel scanning, to search for the channel of the counterpart access point and to change the channel of the access point with the scanned channel when the MAC address of the counterpart access point exists in the MAC address table, however, the sync flag register checks that the channel of the access point is not synchronized with the channel of the counterpart access point.

A second aspect of the present invention provides a method of controlling channel change in an access point, the method including the steps of: checking whether an event of requesting to change a channel used for transmitting and receiving a packet between the access point and a counterpart access point occurs; and when the channel change event occurs, performing channel change while maintaining channel-synchronization with the counterpart access point constituting a WDS link.

When the channel change request event occurs due to a received channel change request message, channel change is performed according to channel information included in the channel change request message.

The method of controlling channel change in an access point may further include the steps of: when the channel change request event occurs not due to a received channel change request message, checking whether a MAC address of the counterpart access point exists in a MAC address table; and when it is checked that the MAC address of the counterpart access point does not exist in the MAC address table, selecting a channel according to a channel selection policy and performing channel change alone.

The method of controlling channel change in an access point may further include the steps of: when it is checked that the MAC address of the counterpart access point exists in the MAC address table, checking whether or not a channel of the access point is synchronized with that of the counterpart access point; when the channel of the access point is synchronized with that of the counterpart access point, selecting a channel according to the channel selection policy and performing channel change; and transmitting a message for requesting to change the channel with the selected channel to the counterpart access point.

The method of controlling channel change in an access point may further include the steps of: when the MAC address of the counterpart access point exists in the MAC address table, but the channel of the access point is not synchronized with that of the counterpart access point, scanning the counterpart access point; and changing the channel of the access point with a scanned channel of the counterpart access point.

BRIEF DESCRIPTION OF THE DRAWINGS

A more complete appreciation of the invention, and many of the attendant advantages thereof, will be readily apparent as the same becomes better understood by reference to the following detailed description, when considered in conjunction with the accompanying drawings, in which like reference symbols indicate the same or similar components, wherein.

DETAILED DESCRIPTION OF THE INVENTION

Hereinafter, exemplary embodiments of the present invention will be described in detail with reference to the accompanying drawings. In the following description, a detailed description of known functions and configurations incorporated herein has been omitted for conciseness. The following description will be made regarding exemplary embodiments in which the present invention is applied to an access point and a method of controlling channel change in the access point. It should be noted that the following exemplary embodiments are merely to help with understanding the present invention, and thus are not to be interpreted as limiting the scope of the present invention.

Figure 1:
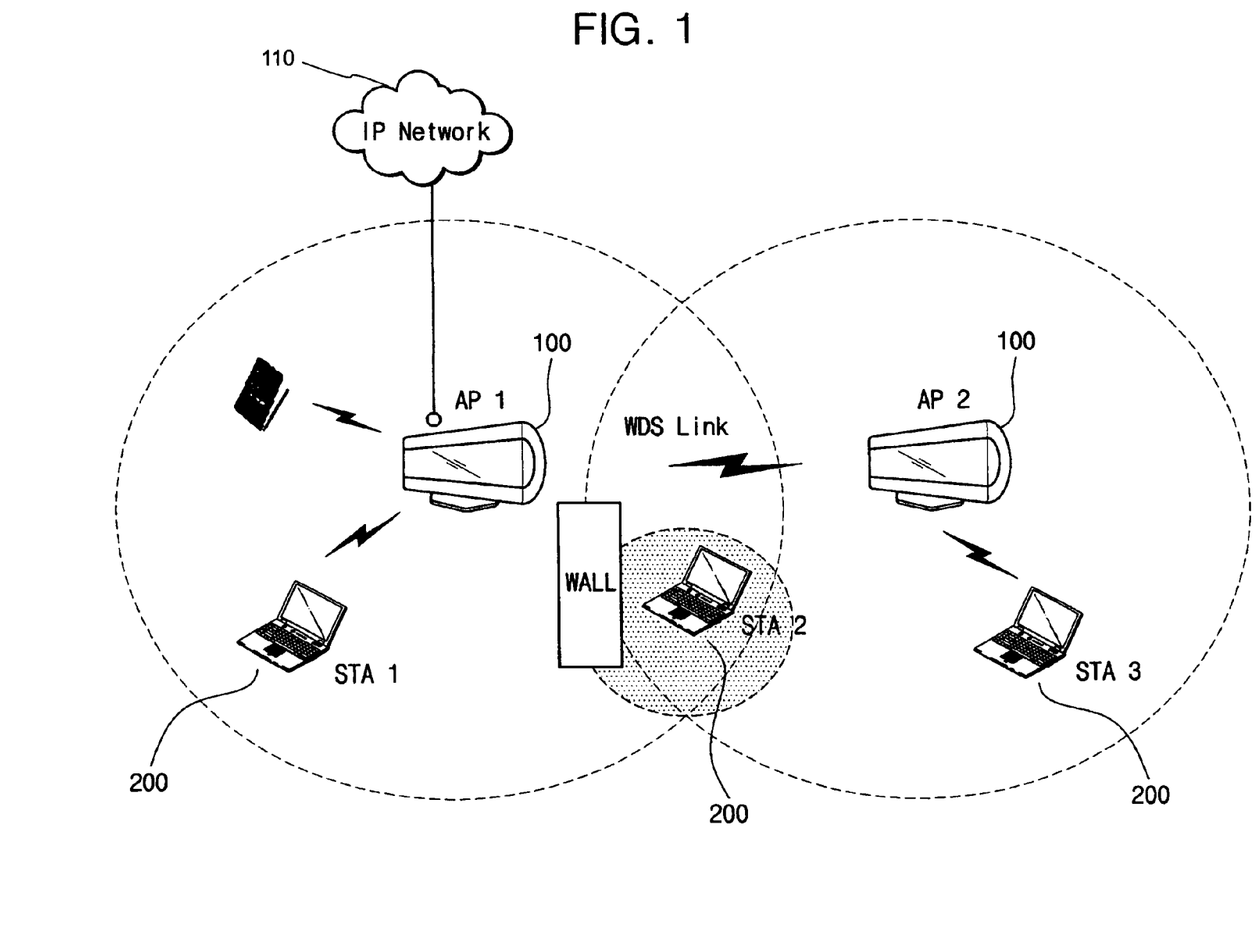
FIG. 1 illustrates a constitution of a wireless local area network (LAN) network constructed according to the present invention.

FIG. 1 illustrates a constitution of a wireless local area network (LAN) network constructed according to the present invention.

Referring to FIG. 1, the wireless LAN network constructed according to the present invention includes a plurality of stations (STA) 200 and two (2) access points 100. Users receive a wireless LAN service using the plurality of stations 200, which transmit data to and receive data from an external network 110, such as the Internet, via the access points 100 included in different cells.

Particularly in a Wireless Distribution System (WDS), the two (2) access points 100 can transmit and receive data, and this characteristic facilitates data transmission and reception between two (2) stations 200 existing in different cells.

Two (2) access points 100 must share a channel for data transmission and reception. In the present invention, when an event in which a channel for data transmission and reception between access points 100 must be changed occurs, the access points AP1 100 informs of this event to a counterpart access point AP2 100, thereby preventing a WDS link from being disconnected. A constitution of an access point for changing a channel while maintaining a WDS link and a method of controlling channel change in the access point will be described in details below.

Figure 2:
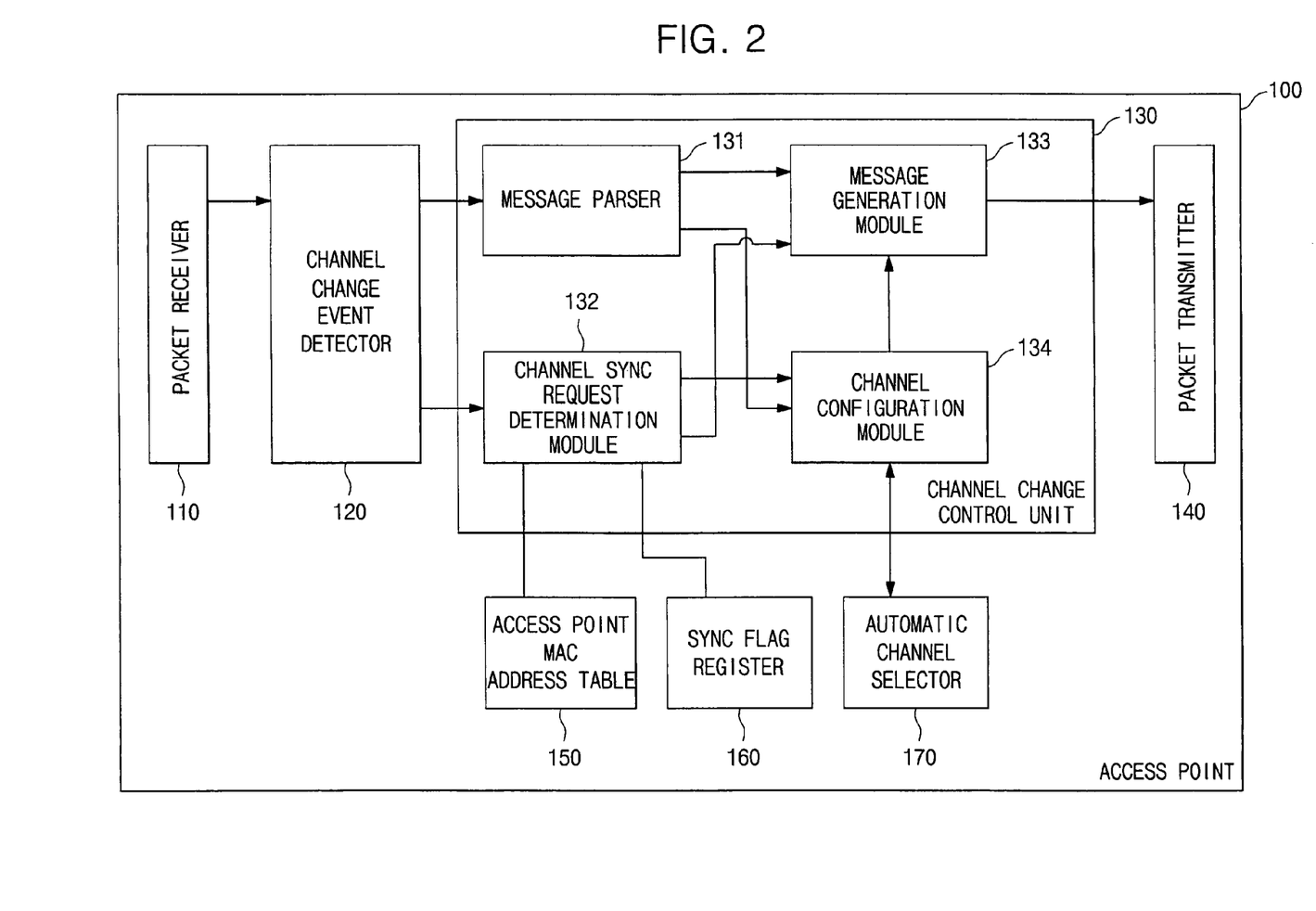
FIG. 2 is a block diagram of a wireless LAN network access point constructed according to an exemplary embodiment of the present invention.

FIG. 2 is a block diagram of a wireless LAN network access point constructed according to an exemplary embodiment of the present invention.

As illustrated in FIG. 2, access point AP1 100 constructed according to an exemplary embodiment of the present invention comprises a packet receiver 110, a channel change event detector 120, a channel change control unit 130, a packet transmitter 140, an access point Media Access Control (MAC) address table 150, a sync flag register 160, an automatic channel selector 170, and so on.

The channel change event detector 120 checks whether an event of requesting to change a channel used for transmitting and receiving a packet between the access points 100 occurs. The channel change request event occurs when a wireless LAN driver is initialized after booting up, a radar detection event occurs during operation and channel avoidance is attempted, a user manually changes a channel, a channel change request message is received from a counterpart access point, and other similar situations. When a channel change request event occurs, the occurred event and a control signal giving an instruction to perform channel change are transferred to channel change control unit 130.

Access point MAC address table 150 stores a MAC address of the counterpart access point. Such a table may be stored in a memory or a disk existing in access point AP1 100.

Sync flag register 160 stores a sync flag indicating whether or not the two (2) access points 100 between which a WDS link is established use the same channel. When a value of the sync flag is "1", the two (2) access points 100 use the same channel. The same channel is used by the two (2) access points and the channel selection policy may be set when the value of the sync flag is "0".

Automatic channel selector 170 automatically selects a channel between access points when a channel selection policy is set to "Auto". An automatic channel selection algorithm used by automatic channel selector 170 is already known to those skilled in arts, and thus a detailed description thereof will be omitted.

When receiving the control signal giving an instruction to perform channel change from channel change event detector 120, channel change control unit 130 performs channel change for transmitting and receiving a packet between access points using the following sub-components included therein: a message parser 131, a channel sync request determination module 132, a message generation module 133 and a channel configuration module 134.

When receiving a channel change request message from counterpart access point AP2 100, channel change event detector 120 transfers the channel change request message to message parser 131. Message parser 131 makes message generation module 133 generate a channel change response message and transmit the channel response message to counterpart access point AP2 100 while transferring channel information included in the channel change request message to channel configuration module 134.

Channel change event detector 120 transfers a control signal to channel sync request determination module 132 of channel change control unit 130 when an event occurs, such as wireless LAN driver initialization, channel change due to channel avoidance attempt, and other related events.

Channel sync request determination module 132 first searches access point MAC address table 150 to check whether the MAC address of counterpart access point AP2 100 constituting the WDS link exists in access point MAC address table 150. In addition, channel change control unit 130 checks a sync flag value stored in sync flag register 160 and determines whether two access points 100 use the same channel.

When the MAC address of the counterpart access point is not registered, channel sync request determination module 132 transfers a current channel selection policy and a channel selection instruction to channel configuration module 134.

When the MAC address of counterpart access point AP2 100 is registered and the sync flag value is "1", channel sync request determination module 132 makes message generation module 133 generate a channel change request message and transmit the channel response message to counterpart access point AP2 100 while transferring a channel selection instruction to channel configuration module 134.

In addition, when the MAC address of counterpart access point AP2 100 is registered, and the sync flag value is "0", channel sync request determination module 132 controls access point AP1 100 to scan counterpart access point AP2 100. Here, a conventional scanning method and conventional scanning components may be used, and thus a detailed description thereof will be omitted. When counterpart access point AP2 100 is detected, scanned channel information is transferred to channel configuration module 134. On the other hand, when counterpart access point AP2 100 is not detected, the current channel selection policy and a channel selection instruction are transferred to channel configuration module 134.

Channel configuration module 134 configures a channel using channel information included in the channel selection policy received from channel sync request determination module 132 or the channel change request message received from message parser 131.

When the channel selection policy is set to "Auto", channel configuration module 134 requests automatic channel selector 170 for a channel to configure, and then performs channel change according to the request result. When the channel selection policy is set to "Static", channel configuration module 134 changes a channel with a channel corresponding to a value input by a user or a previously set value.

Message generation module 133 generates a channel change request message or a channel change response message in accordance to control of message parser 131 or channel sync request determination module 132, and transfers the channel change request message or the channel change response message to packet transmitter 140.

Packet transmitter 140 and packet receiver 110 physically perform packet transmission and reception between the access points 100 or between an access point 100 and a terminal, and the like. Packet receiver 110 and packet transmitter 140 constructed to the present invention perform packet transmission based on the wireless LAN network regulation IEEE 802.11. In particular, packet receiver 110 and packet transmitter 140 constructed to the present invention receive and transmit a packet from and to the other access point 100 by using the channel configured by channel change control unit 130.

Figure 3:
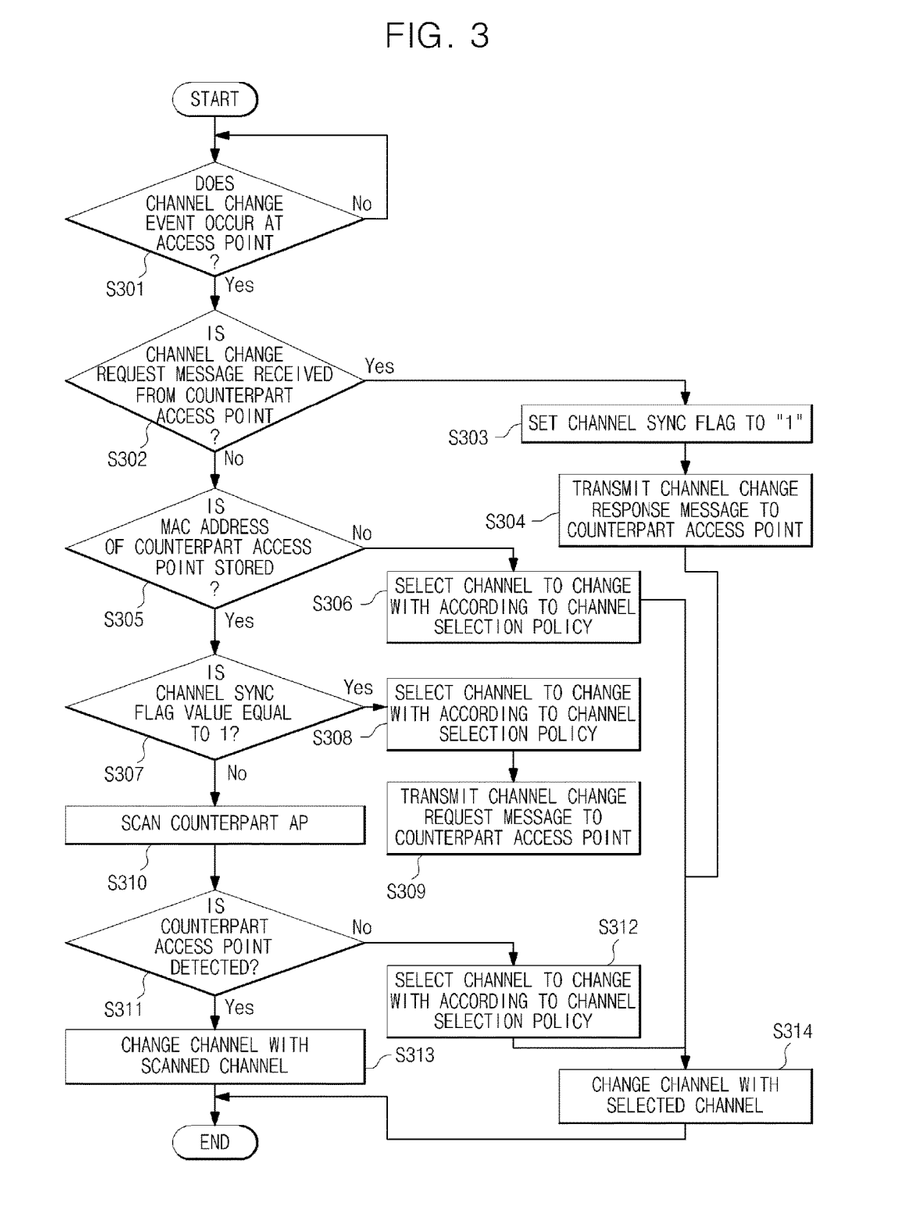
FIG. 3 is a flowchart showing a method of controlling channel change in an access point constructed according to an exemplary embodiment of the present invention.

FIG. 3 is a flowchart showing a method of controlling channel change in an access point constructed according to an exemplary embodiment of the present invention.

An access point checks whether a channel change request event between the access point and a counterpart access point occurs (step 301). As described above, the channel change request event occurs when i) a wireless LAN driver is initialized after booting, ii) a radar detection event occurs during operation and channel avoidance is attempted, iii) a user manually changes a channel, iv) a channel change request message is received from a WDS counterpart access point, and other related situations occur.

The access point first checks whether the channel change request event has occurred due to a channel change request message received from the counterpart access point (step 302).

When the channel change request event has occurred due to a channel change request message received from the counterpart access point, the access point sets a sync flag value to "1" (step 303), and then transmits a channel change response message, i.e., ACK message, to the counterpart access point (step 304). Subsequently, the access point performs channel change using channel information included in the channel change request message (step 314).

When the channel change request event has occurred not due to a channel change request message received from the counterpart access point, the access point searches a MAC address table and determines whether a MAC address of the counterpart access point constituting a WDS link exists (step 305). When the MAC address of the counterpart access point is not stored in the MAC address table, it is determined that a WDS link has not been previously established. Therefore, the access point selects a channel in accordance to a channel selection policy (step 306), and then performs channel change according to the selected channel (step 314).

When the MAC address of the counterpart access point exists in the MAC address table, the access point checks a sync flag value to determine whether the access point and the counterpart access point use the same channel (step 307). In this exemplary embodiment, when the channel sync flag value is "1", it is assumed that the access point and the counterpart access point use the same channel.

When the sync flag value is "1", the access point selects a channel in accordance to the channel selection policy as step 308. In this case, a process of transmitting a channel change request message for channel synchronization with the counterpart access point (step 309) is executed. The access point also performs channel change according to the selected channel (314) in this situation. In this case, it is checked whether a response to the channel the channel change request message is received, and when it is determined that a message transmission error has occurred, the message may be transmitted multiple times.

When sync flag value shows that the access point and the counterpart access point do not use the same channel, the access point scans the counterpart access point (step 310). When the scanning is successively performed to detect the counterpart access point, the access point selects a scanned channel. Subsequently, the access point sets a sync flag to "1" and then changes a channel with the scanned channel (step 313). This is for a case in which a WDS link is newly established.

When the counterpart access point is not detected in step 311, the access point selects a channel to change with according to the channel selection policy (step 312) and changes a channel with the selected channel (step 314).

Figure 4:
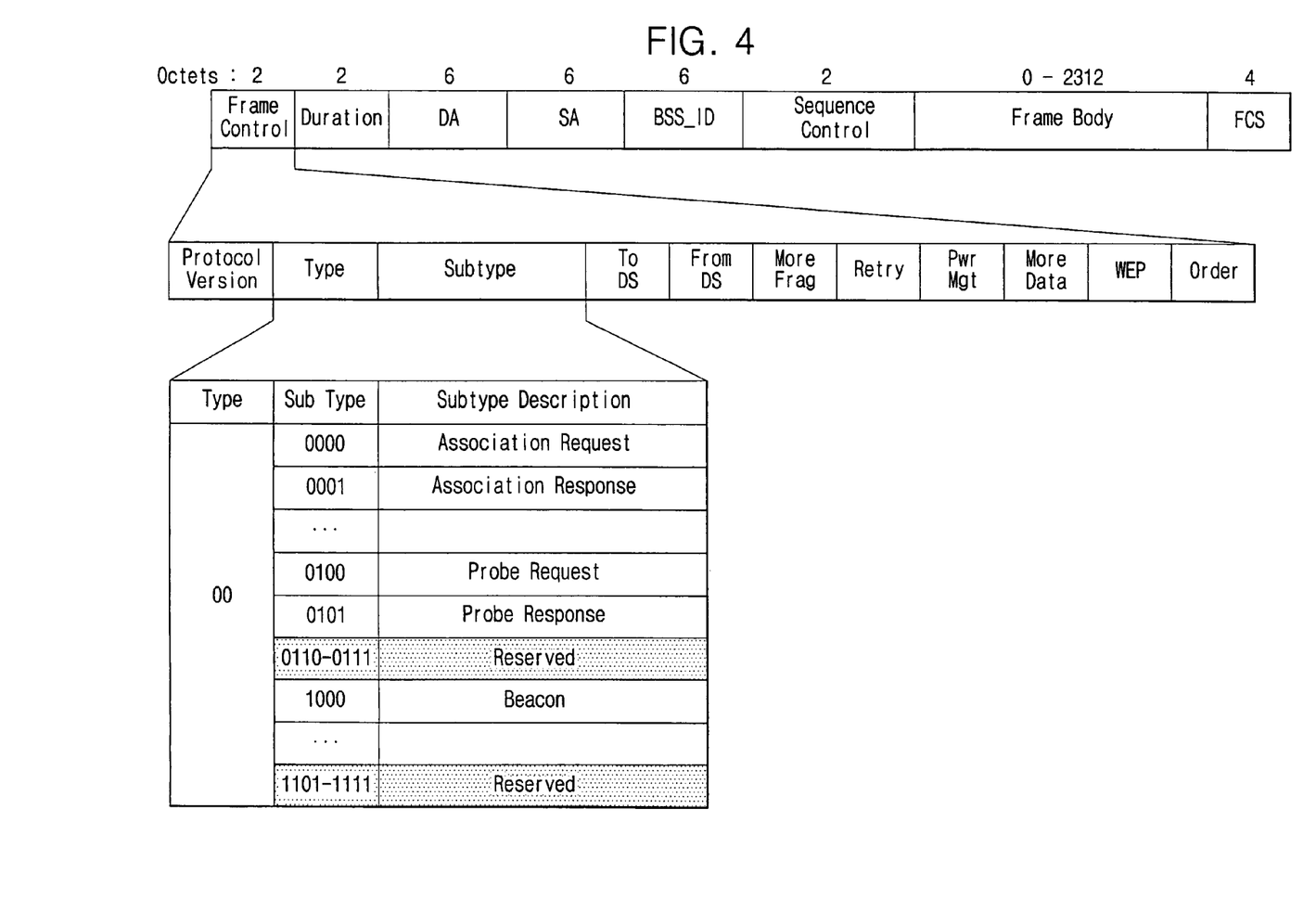
FIG. 4 illustrates a constitution of a frame control message used by an access point constructed according to an exemplary embodiment of the present invention.

FIG. 4 illustrates a constitution of a frame control message used by an access point constructed according to an exemplary embodiment of the present invention.

As illustrated in FIG. 4, the message exchanged between access points may include a frame control field, a duration field, a Destination Address (DA) field, a Source Address (SA) field, a BSS_ID field, a sequence control field, a frame body field and a Frame Check Sequence (FCS) field.

Among the fields, the frame control field corresponding to a header of the message may be used in order to indicate a channel change request message and a channel change response message, i.e., ACK message to the channel change request message constructed to the present invention.

More specifically, the frame control field includes fields of protocol version, type, subtype, ToDS, FromDS, MoreFlag, Retry, Pwr Mgt, More Data, WEP, Order, and so on.

When the ToDS field and the FromDS field both have a value of "1", the message is determined as a message exchanged between access points. Thus, when an access point transmits a channel change request message or a channel change response message, i.e., ACK message, the 2 fields (i.e. ToDS and FromDS) are both set to "1".

The type field and the subtype field consist of 2 bits and 4 bits, respectively. In the frame type field, 3 types of frames, i.e., management (00), control (01) and data (10), may be specified, and also subtypes of each type may be separately specified. By combining the type field and the subtype field, it is applicable to various types of access point messages. For example, "000000" indicates that the type field has a value of "00" and the subtype field has a value of "0000", which denotes an association request message of a management type frame.

In the present invention, "0110", "0111", etc., may be used as a subtype code of the management type. For example, "0110" may be set as a code indicating a channel change request message, and "0111" may be set as a code indicating a channel change response message, i.e., ACK message to a channel change request.

When the channel change request message is defined by a value of "0110", it is possible to insert channel information whereby channel change is requested to a counterpart access point in the frame body field.

In brief, in a frame control field of a channel change request message, the ToDS field and the FromDS field may have a value of "1", the type field may have a value of "00", and the subtype field may have a value of "0110". In addition, channel information whereby channel change is requested may be inserted into a frame body field which has a size range of 0 to 2312 bits.

In a frame control field of a channel change response message, i.e., ACK message to a channel change request message, the ToDS field and the FromDS field may have a value of "1", the type field may have a value of "00", and the subtype field may have a value of "0111". In this case, it is unnecessary to insert channel information, and thus a frame body field may not be used.

As described above, according to the inventive access point and method of controlling channel change in the access point, every time a channel of an access point connected by a WDS link is changed, a channel of a counterpart access point is also changed to be the same as that of the access point. Thus, even when the channel of the access point is changed, the WDS link is normally maintained, which enables a user to stably use the WDS link regardless of channel change. In particular, this has a great effect on removing the limitation of using a WDS in an 11a band indispensably requiring Dynamic Frequency Selection (DFS).

While the present invention has been described with reference to exemplary embodiments thereof, it will be understood by those skilled in the art that various changes in from and detail may 19 be made therein without departing from the scope of the present invention as defined by the following claims.

What is claimed is:

1. An access point, comprising:
at least one processor; and
at least one memory comprising:
 a sync flag indicating whether a radio channel of the access point is synchronized with a radio channel of a counterpart access point;
 a Media Access Control (MAC) address table comprising an MAC address of the counterpart access point; and
 computer code,
wherein the at least one memory and the computer code are configured to, with the at least one processor, cause the access point at least to:
 determine occurrence of an event corresponding to a request to change the radio channel of the access point, the radio channel of the access point being configured to enable transmission and reception of packets between the access point and the counterpart access point; and
 change, in response to the determination and based on a value of the sync flag, the radio channel of the access point to provide radio channel-synchronization with the counterpart access point, the access point and the counterpart access point being linked via a Wireless Distribution System (WDS) link;
 search the MAC address table for the MAC address of the counterpart access point;
 select, in response to the MAC address table being void of the MAC address of the counterpart access point, a radio channel according to a channel selection policy and change the radio channel of the access point to the selected radio channel;
 determine, in response to the MAC address of the counterpart access point being in the MAC address table, that the radio channel of the access point is synchronized with the radio channel of the counterpart access point based on the value of the sync flag being a determined value; select, in response to the radio channel of the access point being synchronized with the radio channel of the counterpart access point, a radio channel according to the channel selection policy; and change the radio channel of the access point to the selected radio channel; and
 scan, in response to the MAC address of the counterpart access point being in the MAC address table and the radio channel of the access point not being synchronized with the radio channel of the counterpart access point, the counterpart access point; and perform, in association with the access point, a radio channel change to a scanned channel of the counterpart access point.

2. The access point of claim 1, wherein the at least one memory and the computer code are further configured to, with the at least one processor, cause the access point to:
check the MAC address table and the value of the sync flag to determine whether the radio channel of the access point and the radio channel of the counterpart access point are the same radio channel.

3. The access point of claim 2, wherein the at least one memory and the computer code are further configured to, with the at least one processor, cause the access point to:
transmit a radio channel change request message to the counterpart access point in response to a determination that the MAC address of the counterpart access point exists in the MAC address table and a determination, based on the value of the sync flag being a determined value, that the radio channel of the access point is synchronized with the radio channel of the counterpart access point.

4. A method of controlling channel change in an access point, the method comprising:
determining occurrence of an event corresponding to a request to change a radio channel of the access point, the radio channel being used for transmitting and receiving packets between the access point and a counterpart access point;
determining a value of a sync flag, the value indicating whether the radio channel of the access point is synchronized with a radio channel of the counterpart access point;
performing, in response to determining the occurrence of the event and based on the value of the sync flag, a radio channel change while maintaining radio channel-synchronization with the counterpart access point, the access point being linked to the counterpart access point via a Wireless Distribution System (WDS) link;
determining, in an absence of the request to change a radio channel, whether a Media Access Control (MAC) address of the counterpart access point exists in a MAC address table; selecting, in response to determining the MAC address table is void of the MAC address of the counterpart access point, a radio channel according to a channel selection policy;
performing, in association with the access point, a radio channel change to the selected radio channel;
determining, in response to determining that the MAC address of the counterpart access point exists in the MAC address table and in response to determining that the value of the sync flag is a determined value, that the radio channel of the access point is synchronized with the radio channel of the counterpart access point;
selecting, in response to determining that the radio channel of the access point is synchronized with the radio channel of the counterpart access point, a radio channel according to the channel selection policy;
performing, in association with the access point, a radio channel change to the selected radio channel;
transmitting, to the counterpart access point, a message to request a radio channel change to the selected channel;
scanning, in response to determining that the MAC address of the counterpart access point exists in the MAC address table and in response to determining that the radio channel of the access point is not synchronized with the radio channel of the counterpart access point, the counterpart access point; and
performing, in association with the access point, a radio channel change to a scanned channel of the counterpart access point.

5. The method of claim 4, wherein:
the request comprises radio channel information; and
wherein the radio channel change is performed according to the channel information.

* * * * *